(No Model.)　　　　　　　　　　　　　　　　2 Sheets—Sheet 1.
J. H. JUDGE.
AUTOMATIC DISTRIBUTING NOZZLE.
No. 599,846.　　　　　　　　　　　Patented Mar. 1, 1898.
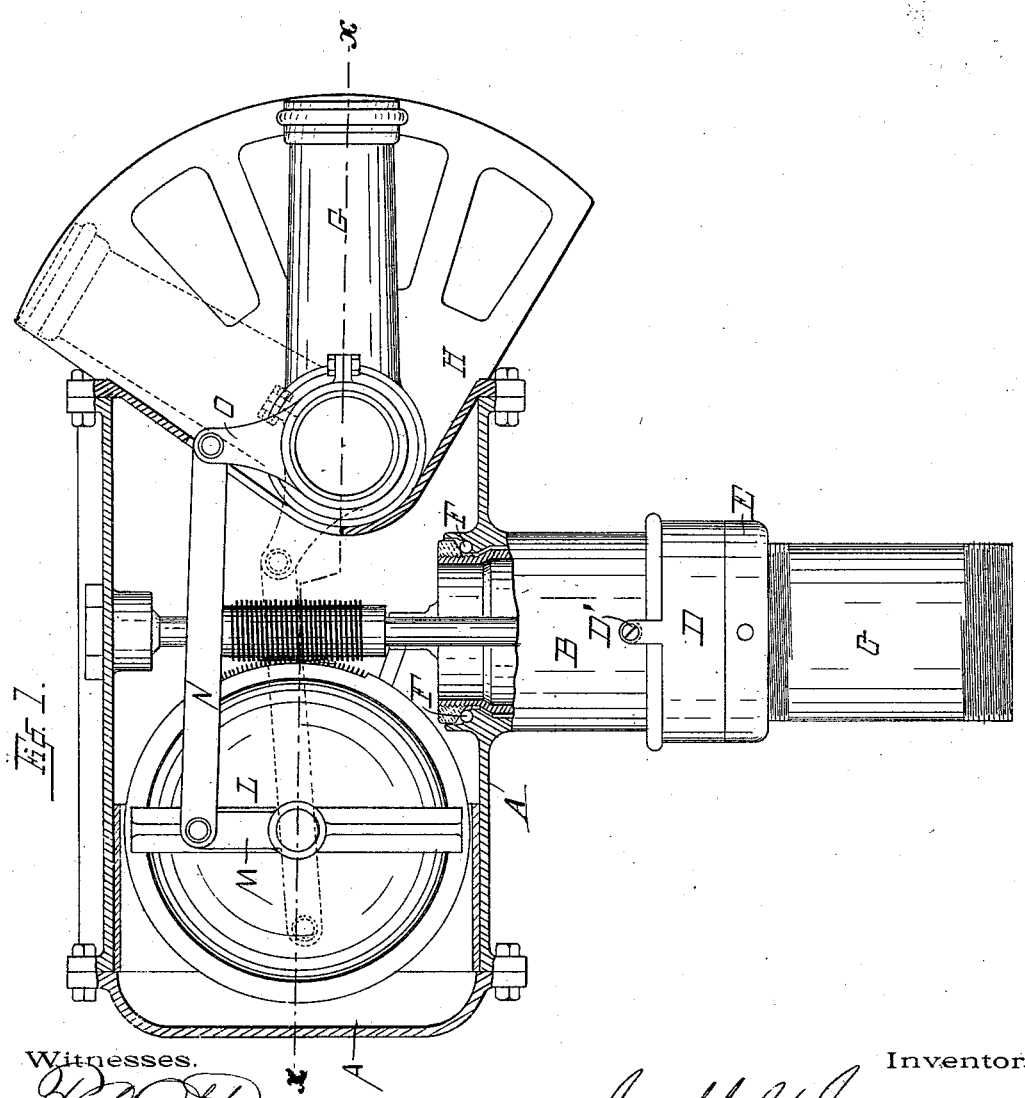

(No Model.) 2 Sheets—Sheet 2.
J. H. JUDGE.
AUTOMATIC DISTRIBUTING NOZZLE.
No. 599,846. Patented Mar. 1, 1898.
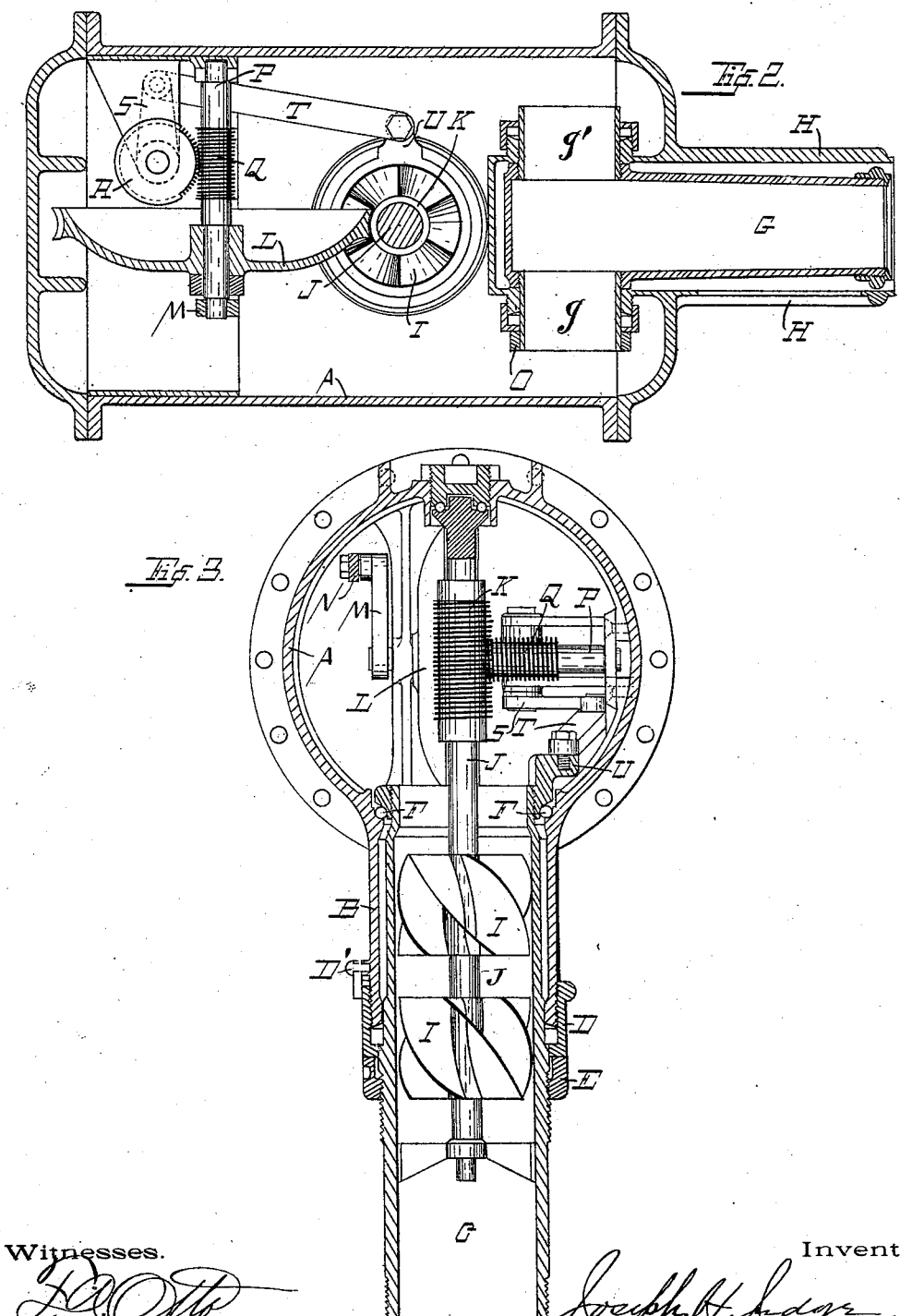
Witnesses.
Inventor.

UNITED STATES PATENT OFFICE.

JOSEPH H. JUDGE, OF MILWAUKEE, WISCONSIN, ASSIGNOR TO JOHN W. SUETTERLE, OF SAME PLACE.

AUTOMATIC DISTRIBUTING-NOZZLE.

SPECIFICATION forming part of Letters Patent No. 599,846, dated March 1, 1898.

Application filed June 8, 1897. Serial No. 639,792. (No model.)

*To all whom it may concern:*

Be it known that I, JOSEPH H. JUDGE, a citizen of the United States, residing at Milwaukee, in the county of Milwaukee and State of Wisconsin, have invented new and useful Improvements in Automatic Distributing-Nozzles, of which the following is a specification.

My invention relates to improvements in fire-extinguishers, and pertains more especially to the peculiar construction of the device by which the nozzle is automatically actuated and caused to distribute the water in all directions.

In the following description reference is had to the accompanying drawings, in which—

Figure 1 is a side view of my invention, showing the inclosing shell partly in section, exposing the interior mechanism. Fig. 2 is a horizontal sectional view, drawn on line X X of Fig. 1. Fig. 3 is a view of the rear section, drawn on line Y Y of Fig. 1.

Like parts are identified by the same reference-letters throughout the several views.

A is an inclosing water-tight shell within which the nozzle-actuating mechanism is located and through which the water passes to the nozzle. This shell is provided with a downwardly-projecting tubular shank B, which is adapted to fit over the water-supply pipe C, with a packing-collar D screwed onto its lower end, which is seated upon a bearing-collar E.

D' is a set-screw for locking the collar D to the shank B.

The upper end of the pipe C and opposing face of the shank B are grooved to form a seat for the ball-bearings F, upon which the shell rotates, as hereinafter explained. The lower end of the pipe C is screw-threaded to facilitate the attachment of the nozzle to a water tower, pipe, or hose.

G is a discharge-nozzle which communicates with the chamber A through its pivotal inlet-ducts $g\ g'$. The nozzle is caused to oscillate vertically upon its pivotal support, as hereinafter explained, and is protected from injury by the side guards or shields H H, which project from the shell.

Within the supply-pipe C, I have provided a screw-shaped propeller, which is actuated by the escaping water and from which motion is communicated to the nozzle through the shaft J, worm K, gear L, crank M, crank-rod N, and arm O, the latter being attached rigidly to the supporting-duct $g$ of the discharge-tube. The shell is also oscillated laterally upon its bearings on the pipe C, motion being communicated to it from the propeller through the shaft J, worm K, gear L, gear-wheel shaft P, worm Q, and gear-wheel R, the latter being provided with a crank S, which is connected by a rod T to a fixed arm U, which projects from the upper end of the pipe C.

It will be observed that the crank S pushes and pulls upon the rod T, which, being attached to the fixed arm U outside of the center of oscillation of the shell, causes the latter to swing from side to side with the pressure exerted against the arm U.

Having thus described my invention, what I claim as new, and desire to secure by Letters Patent, is—

1. The combination of a water-tight shell, a water-supply pipe communicating with said shell, a nozzle secured to said shell, through which the water is discharged, a water-actuated propeller located in the supply-pipe, and mechanism located within said shell for communicating the motion of the propeller to the nozzle.

2. The combination of a water-tight shell, a water-supply pipe communicating therewith, a discharge-nozzle having a branched supporting duct or ducts pivotally secured to the shell and communicating between the shell and nozzle, a propeller located in the supply-pipe, and mechanism located within said shell for communicating motion from the propeller to the nozzle.

3. The combination of a water-tight rotatable shell, a water-supply pipe communicating therewith, a discharge-nozzle secured to said shell, a water-actuated propeller located in the supply-pipe, and mechanism within said shell for communicating motion from the propeller to the shell.

4. The combination of a supply-pipe, a shell rotatably secured thereto and provided with an oscillatory nozzle, a water-actuated propeller located in said inlet-pipe, and means for communicating independent motions therefrom to the shell and nozzle, substantially as described.

5. The combination of a supply-pipe, a shell rotatably secured to said pipe, a T-shaped nozzle pivotally secured to the shell, and adapted to permit the escape of water through its supporting-ducts, a water-actuated propeller located in the inlet-pipe, and means for communicating independent motion therefrom to the shell and nozzle, substantially as described.

6. The combination of a supply-pipe, a shell rotatably secured to said pipe, an oscillatory nozzle secured to said shell, a water-actuated propeller located in the inlet-pipe with a shaft projecting upwardly into said shell, crank and gearing connections for actuating the nozzle from said shaft, and eccentric connections and gearing for oscillating the shell, substantially as described.

7. The combination of a supply-pipe, a shell rotatably secured to said pipe and provided with a discharge-nozzle, a water-actuated propeller located in the inlet-pipe and provided with an upwardly-projecting shaft, a crank actuated from said shaft by suitable gearing, and a rod connecting said crank with a fixed arm projecting from the upper end of the inlet-pipe, whereby an oscillatory motion is communicated from the propeller to the shell, substantially as described.

8. The combination of a water-supply pipe, a nozzle pivotally connected therewith, a water-actuated propeller located in the supply-pipe, and provided with a worm-shaft, a gear-wheel actuated by said worm, and a crank-rod connecting said gear-wheel with said nozzle and arranged to communicate a reciprocating movement from the propeller to the nozzle, substantially as described.

In testimony whereof I affix my signature in the presence of two witnesses.

JOSEPH H. JUDGE.

Witnesses:
JAS. B. ERWIN,
C. L. ROESCH.